(12) United States Patent
Pianigiani et al.

(10) Patent No.: US 11,303,555 B2
(45) Date of Patent: Apr. 12, 2022

(54) INTER-DATA CENTER SOFTWARE-DEFINED NETWORK CONTROLLER NETWORK

(71) Applicant: Juniper Networks, Inc., Sunnyvale, CA (US)

(72) Inventors: Jacopo Pianigiani, Cupertino, CA (US); Suresh K Balineni, Milpitas, CA (US); Anantharamu Suryanarayana, San Jose, CA (US); Atul S Moghe, San Jose, CA (US); Shivayogi Ugaji, Sunnyvale, CA (US); Tong Jiang, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 356 days.

(21) Appl. No.: 16/457,050

(22) Filed: Jun. 28, 2019

(65) Prior Publication Data

US 2020/0344147 A1 Oct. 29, 2020

Related U.S. Application Data

(60) Provisional application No. 62/839,163, filed on Apr. 26, 2019.

(51) Int. Cl.
*H04L 12/751* (2013.01)
*H04L 12/24* (2006.01)
(Continued)

(52) U.S. Cl.
CPC .......... *H04L 45/02* (2013.01); *H04L 41/0886* (2013.01); *H04L 43/14* (2013.01);
(Continued)

(58) Field of Classification Search
CPC .............. H04L 29/06; H04L 29/08072; H04L 29/08981; H04L 41/0806; H04L 41/12
(Continued)

(56) References Cited

U.S. PATENT DOCUMENTS 10,200,248 B1 2/2019 Jiang et al.
10,200,274 B1 2/2019 Suryanarayana et al.
(Continued)

FOREIGN PATENT DOCUMENTS

WO 2013184846 A1 12/2013

OTHER PUBLICATIONS

Noghani et al., "Automating Ethernet VPN deployment in SDN-based Data Centers," IEEE, 2017 Fourth International Conference on Software Defined Systems (SDS), May 8-11, 2017, pp. 61-66.
(Continued)

*Primary Examiner* — Hermon Asres
(74) *Attorney, Agent, or Firm* — Shumaker & Sieffert, P.A.

(57) ABSTRACT

Techniques are disclosed for providing a Software Defined Networking (SDN) controller with real-time or near-real time visibility of the operation of data center fabrics to determine whether the DCI was properly configured. For example, an SDN controller receives high-level configuration data that describes a desired state of a network managed by the SDN controller at a high level of abstraction. The SDN controller applies a transformation function to the high-level configuration data to generate a low-level configuration data for network devices configured to implement the desired state of the network. SDN controller configures the SDN controller as a peer to the network devices to obtain one or more routes exchanged between the network devices. The SDN controller sends the low-level configuration data (Continued)

to the network devices to cause the network devices to implement the desired state of the network.

15 Claims, 5 Drawing Sheets

(51) Int. Cl.
    *H04L 12/26*     (2006.01)
    *H04L 12/721*     (2013.01)
    *H04L 12/771*     (2013.01)
    *H04L 12/715*     (2013.01)
    *H04L 45/02*     (2022.01)
    *H04L 41/08*     (2022.01)
    *H04L 43/00*     (2022.01)
    *H04L 45/00*     (2022.01)
    *H04L 45/64*     (2022.01)

(52) U.S. Cl.
    CPC .............. *H04L 45/38* (2013.01); *H04L 45/56* (2013.01); *H04L 45/64* (2013.01)

(58) Field of Classification Search
    USPC ........................................................ 709/220
    See application file for complete search history.

(56) References Cited

U.S. PATENT DOCUMENTS

| | | | |
|---|---|---|---|
| 2016/0112246 A1* | 4/2016 | Singh | H04L 41/0873 |
| | | | 370/254 |
| 2016/0234121 A1* | 8/2016 | Zou | H04L 45/02 |
| 2017/0163532 A1 | 6/2017 | Tubaltsev et al. | |
| 2017/0187607 A1* | 6/2017 | Shaikh | H04L 41/042 |
| 2018/0167458 A1* | 6/2018 | Ould-Brahim | H04L 43/0882 |
| 2019/0166003 A1* | 5/2019 | Shelke | H04L 41/046 |

OTHER PUBLICATIONS

Extended Search Report from counterpart European Application No. 19199090.2, dated Feb. 25, 2020, 11 pp.
Response to Extended European Search Report dated Feb. 25, 2020, from counterpart European application No. 19199090.2, filed Apr. 26, 2021, 9 pp.
U.S. Appl. No. 16/221,698, filed Dec. 17, 2018, Juniper Networks, Inc. (inventors: Shenoy et al.) entitled Network Device Configuration Using a Message Bus.
Bjorklund, "Yang—A Data Modeling Language for the Network Configuration Protocol (NETCONF)," Internet Engineering Task Force (IETF), RFC 6020, Oct. 2010, 174 pp.

* cited by examiner

INTER-DATA CENTER SOFTWARE-DEFINED NETWORK CONTROLLER NETWORK

This application claims the benefit of U.S. Provisional Patent Application No. 62/839,163 filed on Apr. 26, 2019, which is hereby incorporated by reference herein in its entirety.

TECHNICAL FIELD

This disclosure generally relates to computer networks, and more specifically, to management of network devices.

BACKGROUND

A cloud data center is a data center that provides access to virtualized applications, services, and data storage to off-premises customers. In a typical cloud data center environment, there is a large collection of interconnected servers that provide computing (e.g., compute nodes) and/or storage capacity to run various applications. For example, a cloud data center comprises a facility that hosts virtualized applications and services for customers of the cloud data center.

The cloud data center for example, hosts all the infrastructure equipment, such as networking and storage systems, redundant power supplies, and environmental controls. In a typical cloud data center, clusters of storage systems and application servers are interconnected via high-speed network fabric provided by one or more tiers of physical network switches and routers. More sophisticated cloud data centers provide infrastructure spread throughout the world with subscriber support equipment located in various physical housing facilities. In some examples, the infrastructure of a cloud data center may include a combination of physical devices, which may be referred to as the "underlay resources," that are linked to and communicate with a variety of virtual resources such as virtual servers, agents, and/or policy controllers, which may be referred to as "overlay resources."

Software Defined Networking (SDN) platforms may be used in cloud data centers, and in some cases, may use a logically centralized and physically distributed controller (referred to as "SDN controller"), and a distributed forwarding plane in virtual routers that extend the network from physical routers and switches in the cloud data center into a virtual overlay network hosted in virtualized servers. The SDN controller provides management control, and analytics functions of a virtualized network and orchestrates the virtual routers by communicating with the virtual routers.

The various network devices included in the network fabric typically include mechanisms, such as management interfaces, for locally or remotely configuring these devices. By interacting with the management interface of the network devices, an administrator or other user can perform configuration tasks to configure the devices, and the user can also perform operational commands on the devices to manage, collect, and/or view operational data of the devices. For example, the user may configure interface cards of the device, adjust parameters for supported network protocols, specify physical components within the device, modify routing information maintained by a router, access software modules and other resources residing on the device, and/or perform other configuration tasks. In addition, the user may also provide commands to view current operating parameters, system logs, information related to network connectivity, network activity, or other status information from the devices, as well as view and react to event information received from the devices.

SUMMARY

In general, the disclosure describes techniques for a controller, e.g., SDN controller, that models a desired state of a network, e.g., data center interconnect (DCI), as an overlay networking object (referred to herein as "intent") of a high-level service configuration data model and is configured as a peer to network devices configured to implement the DCI to obtain routes exchanged by the network devices. Based on the obtained routes, the SDN controller may present the routes to a user to determine whether the DCI was properly configured.

In one instance, tenant networks of data centers may interconnect via a DCI. The techniques described herein provide for an SDN controller that models the DCI as an intent of a high-level service configuration data model, which is automatically translated (meaning, e.g., without human oversight or intervention) to a low-level device configuration data model used to configure network devices to implement the DCI. When translating the high-level service configuration data model to the low-level device configuration data model, the SDN controller generates low-level configuration data that configures the SDN controller as a peer (e.g., a border gateway protocol peer) to the network devices configured to implement the DCI.

Network devices, e.g., routers (including virtual routers, which may also be referred to as virtual routing functions—VRFs) configured to implement the DCI may exchange routes, e.g., border gateway protocol (BGP) routes, to advertise routing and reachability of tenant networks of the data centers to the BGP peers, including the SDN controller. As such, the SDN controller may obtain, via the configured peering session with the network devices, the routes exchanged by the network devices. Based on the obtained routes, the SDN controller may present the routes to users to determine whether the intent for the DCI was properly configured and/or whether the routes exchanged are effective for route propagation for the DCI.

In this respect, the techniques described herein may provide for one or more technical advantages. For example, by modeling the DCI as an intent and establishing a peering session to obtain routes from network devices implementing the DCI, the SDN controller may have real-time or near real-time visibility on how the data center fabrics operate (e.g., visibility on all overlay routes for each tenant of a data center), without relying on the exportation of control information from each network device via traditional means, such as SNMP traps, device logs, etc., that are slower and potentially more cumbersome (as each network device may need to be individually polled for the routes) than the techniques described herein. For example, to verify whether the intent is correctly configured, a user no longer is required to retrieve routing information from each network device participating in the DCI, e.g., by logging into an interface for each of the network devices to retrieve the routing advertisements, but instead has visibility on how the data center fabrics operate as routes are being exchanged by the network devices. Moreover, the SDN controller provides visibility on how the data center fabrics operate without operating as the control plane for the network devices implementing the DCI. For example, by maintaining the control plane operation with the network devices while enabling the SDN controller to have visibility of the control plane operation, the reliability of implementing the DCI may be uncompromised.

In one example, a method includes receiving, by a software defined networking (SDN) controller, high-level configuration data that describes a desired state of a network managed by the SDN controller at a high level of abstraction. The method also includes applying, by the SDN controller, a transformation function to the high-level configuration data to generate a low-level configuration data for network devices configured to implement the desired state of the network, wherein generating the low-level configuration data further comprises generating the low-level configuration data to configure the network devices to recognize the SDN controller as a peer to obtain one or more routes exchanged between the network devices. The method further includes sending, by the SDN controller, the low-level configuration data to the network devices to cause the network devices to implement the desired state of the network.

In another example, various aspects of the techniques described herein are directed to a software defined networking (SDN) controller including a memory and one or more processors coupled to the memory, wherein the one or more processors are configured to: receive high-level configuration data that describes a desired state of a network managed by the SDN controller at a high level of abstraction; apply a transformation function to the high-level configuration data to generate a low-level configuration data for network devices configured to implement the desired state of the network, wherein the low-level configuration data further comprises configuration data for the network devices to configure the SDN controller as a peer to obtain one or more routes exchanged between the network devices; and send the low-level configuration data to the network devices to cause the network devices to implement the desired state of the network and to configure the SDN controller as the peer to obtain one or more routes exchanged between the network devices.

In yet another example, various aspects of the techniques described herein are directed to a non-transitory computer-readable storage medium comprising instructions for causing one or more programmable processors to: receive high-level configuration data that describes a desired state of a network managed by the SDN controller at a high level of abstraction; apply a transformation function to the high-level configuration data to generate a low-level configuration data for network devices configured to implement the desired state of the network, wherein the low-level configuration data further comprises configuration data for the network devices to configure the SDN controller as a peer to obtain one or more routes exchanged between the network devices; and send the low-level configuration data to the network devices to cause the network devices to implement the desired state of the network and to configure the SDN controller as the peer to obtain one or more routes exchanged between the network devices.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
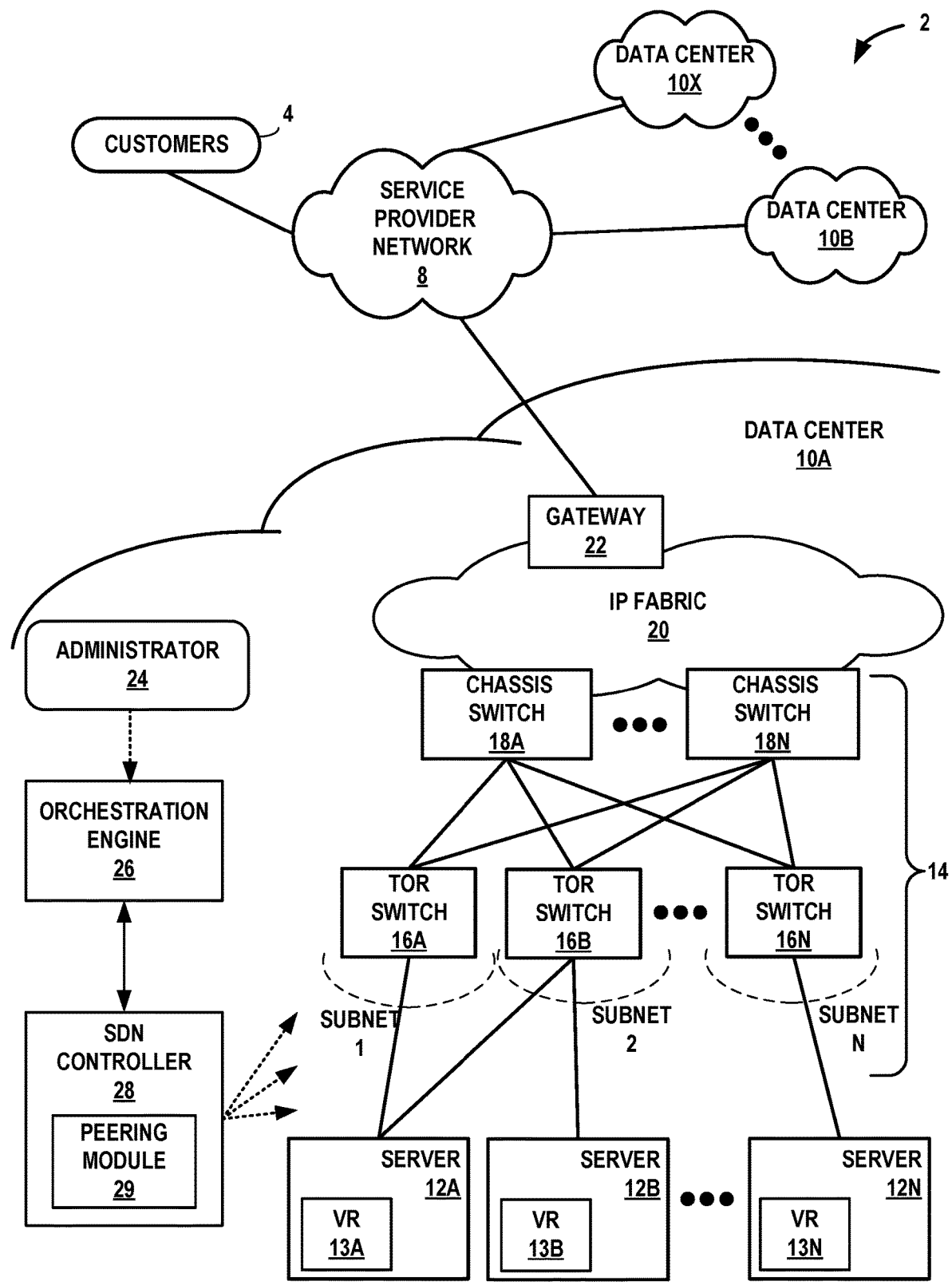
FIG. 1 is a block diagram illustrating an example network system having an SDN controller that models a desired state of a network as an intent of a high-level service configuration data model and is configured as a peer to network devices configured to implement the desired state of a network to obtain routes exchanged by the network devices, in accordance with various aspects of the techniques described herein.

FIG. 1 is a block diagram illustrating an example network system 2 in which examples of the techniques described herein may be implemented. Network system 2 includes data centers 10A-10X (collectively, "data centers 10") interconnected with one another and with customer networks associated with customers 4 via a service provider network 8. In some examples, each data center 10 may represent one of many geographically distributed network data centers. In general, each data center 10 provides an operating environment for applications and services for customers 4 coupled to the data center by service provider network 8. Data centers 10 may, for example, host infrastructure equipment, such as networking and storage systems, redundant power supplies, and environmental controls. Service provider network 8 may be coupled to one or more networks administered by other providers, and may thus form part of a large-scale public network infrastructure, e.g., the Internet.

Customers 4 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some examples, each of data centers 10 may be individual network servers, network peers, or otherwise.

In this example, each of data centers 10 includes a set of storage systems and application servers 12A-12N (herein, "servers 12") interconnected via high-speed switch fabric 14 provided by one or more tiers of physical network switches and routers. Servers 12 function as physical compute nodes of the data center. In some examples, the terms "compute nodes" and "servers" are used interchangeably herein to refer to servers 12. For example, each of servers 12 may provide an operating environment for execution of one or more customer-specific virtual machines ("VMs"). Switch fabric 14 is provided by a set of interconnected top-of-rack (TOR) switches 16A-16N (collectively, "TOR switches 16") coupled to a distribution layer of chassis switches 18A-18N (collectively, "chassis switches 18"). Although not shown, each of data centers 10 may also include, for example, one or more non-edge switches, routers, hubs, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 8. Chassis switches 18 aggregate traffic flows and provides high-speed connectivity between TOR switches 16. TOR switches 16 may be network devices the provide layer two (e.g., media access control (MAC)) and/or layer 3 (e.g., IP) routing and switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customer devices 4 via service provider network 8.

Gateway device 22 may represent a router, switch, or other suitable edge network device that participates in a layer 2 virtual private network ("L2VPN") service, such as EVPN. Gateway device 22 redirects traffic flows to and from data centers 10 that provide network services. For example, gateway device 22 may implement EVPN that uses layer 2 overlays to interconnect multiple edges (e.g., virtual machines) within servers 12 of data center 10A. Gateway device 22 may also provide connectivity for a tenant network (e.g., virtual network) of data center 10A to a tenant network of one or more remote data centers, e.g., data center 10B-10X. For instance, gateway device 22 may provide transport reachability to a gateway device of remote data center 10B. As one example, gateway device 22 may implement a communication protocol, such as multiprotocol border gateway protocol (MP-BGP) or Internet Protocol Virtual Private Network (IP VPN), to communicate reachability of a tenant network of data center 10A to a gateway device of a remote data center. The capability to provide connectivity across tenant networks between data centers 10 is referred to as "data center interconnect."

Data centers 10 may include a Software-Define Network ("SDN") platform to control and manage network behavior. In some cases, an SDN platform includes a logically centralized and physically distributed SDN controller, e.g., SDN controller 28, and a distributed forwarding plane in the form of virtual routers, e.g., virtual routers 13A-13N (collectively, "virtual routers 13" or "VRs 13"), that extend the network from physical routers and switches in the data center switch fabric into a virtual overlay network hosted in virtualized servers. For example, virtual routers 13 may forward traffic between different virtual machines on the same physical host (e.g., server), and/or between virtual machines and the physical network (e.g., switch fabric 14, IP fabric 20). Although illustrated as virtual routers, servers 12 may alternatively, or additionally, include virtual switches or any virtual network device for routing network traffic. Various techniques may be used to transport packets within and across virtual networks over the physical network. Network devices of a data center may, for example, use one or more protocols to enable communication between the virtual network and the physical network. For example, the one or more protocols may include Ethernet Virtual Private Network (EVPN).

SDN controller 28 facilitates operation of one or more virtual networks within each of data centers 10, such as data center 10A. Virtual networks are logical constructs implemented on top of the physical network of a data center. In some examples, virtual networks may be implemented as a virtual private network (VPN), virtual LAN (VLAN), or the like. In some examples, SDN controller 28 may operate in response to configuration input received from an orchestration engine, e.g., orchestration engine 26, which in turn operates in response to configuration input received from a user, such as network administrator 24. Representative orchestrators include Openstack, Kubernetes, Openshift and vCenter. Additional information regarding SDN controller 28 operating in conjunction with other devices of data center 10A or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 26 manages application-layer functions of data center 10 such as managing compute, storage, networking, and application resources executing on servers 12. For example, orchestration engine 26 may attach virtual machines (VMs) to a tenant's virtual network and generally manage the launching, migration and deconstruction of the VMs as needed. Each virtual machine may be referred to as a virtualized application workload (or just application workload) and generally represents a virtualized execution element, such as a VM or a container. Orchestration engine 26 may connect a tenant's virtual network to some external network, e.g. the Internet or a VPN.

In some examples, SDN controller 28 is a lower-level controller tasked with managing the network and networking services of data center 10A and, in particular, switch fabric 14 that provides connectivity between servers 12. SDN controller 28 utilizes a set of protocols to configure and control routing and switching elements of switch fabric 14 to create, for example, an overlay network, which generally refers to a set of tunnels for transporting packets to and from servers 12 within data center 10A.

As described above, a DCI may provide connectivity across tenant networks between the data centers. In some instances, network devices, such as gateway devices, for each of the data centers are separately configured to implement the DCI. To monitor control plane information of the network devices implementing the DCI, a user, such as a network administrator, may in some instances access the control plane information from each of the network devices via SNMP traps, device logs, etc., via an interface, such as a command-line interface ("CLI"). Monitoring the network devices in this manner is operationally cumbersome and time consuming, and does not provide real-time or near real-time visibility of the control plane operation of data center fabrics as the network administrator may have to separately access each network device participating in the DCI to obtain all of the configuration information implementing the DCI. In some cases, an SDN controller may operate as the control plane for the network devices implementing a DCI to have visibility of the control plane operations of the DCI. However, in these cases, the reliability of implementing the DCI is reduced.

In accordance with the techniques described herein, SDN controller 28 may provide real-time or near-real time visibility of the operation of data center fabrics in support of the DCI without operating as the control plane for the network devices within the data center fabrics configured to implement the DCI. For example, SDN controller 28 may model a DCI as an intent of a high-level service configuration data model and, when translating the intent to a low-level device configuration data model, the SDN controller 28 generates low-level configuration data that configures the SDN controller as a peer (e.g., BGP peer) to the network devices configured to implement the DCI to obtain routes exchanged by the network devices. Based on the obtained routes, SDN controller 28 may present the routes to a user to determine whether the DCI was properly configured and/or whether the routes exchanged are effective for route propagation for the DCI.

For example, administrator 24 may access SDN controller 28, e.g., via a command-line interface, to define a data center interconnect as a network overlay object of a high-level service configuration data model to connect tenant networks of data centers 10A and 10B. In one instance, SDN controller 28 may model the DCI as an intent in the high-level service configuration data model, such as higher-level business rules (e.g., "send traffic type a, destined for endpoint b, across link c").

In some examples, the high-level service configuration data model may be expressed as a structured set of parameters, such as Yet Another Next Generation (YANG) as described in Bjorklund, "YANG—A Data Modeling Language for the Network Configuration Protocol (NETCONF)," Internet Engineering Task Force, RFC 6020, October 2010, available at tools.ietf.org/html/rfc6020). In other examples, the high-level service configuration data model may be expressed as Extensible Markup Language (XML) schema. However, the network devices need not support YANG or other structured input schemas. Instead, the translation functions are configured to translate the input high-level service configuration data model into instructions that are needed by the corresponding network devices. Additional examples of the translation functions are described in U.S. application Ser. No. 15/198,657, filed Jun. 30, 2016, and U.S. application Ser. No. 16/221,698, the entire contents of both of which are incorporated by reference herein.

SDN controller 28 may implement a transformation function to translate the high-level service configuration data model for the DCI to a low-level device configuration data model (e.g., rules/policies) that describes how network devices of data centers 10 are to implement the DCI and, as further described below, when translating the data model, configuring the SDN controller 28 as a peer (e.g., BGP peer) to the network devices to obtain routes exchanged by the network devices. In some examples, the low-level device configuration data model may be expressed as Python or Perl scripts used to perform a specific or narrow set of functions. In other examples, more complex automation tools such as Ansible (found in https://docs.ansible.com) and Puppet may be used. Ansible is a provisioning, configuration and deployment tool that relies on playbooks to define sequences of tasks. Ansible uses playbooks to describe automation jobs as tasks via a human friendly data serialization language named YAML. YAML is standardized language commonly used for configuration files. It can, however, be used in any application where data is stored. YAML is very easy for humans to understand, read and write and can be used advantageously in an application like Ansible to describe and document playbooks. Puppet is a configuration management tool used to simplify the defining of IT infrastructure as code and the enforcement of system configurations.

As one example, SDN controller 28 may translate the high-level service configuration data model (e.g., expressed as YANG parameters) into low-level device configuration data model (e.g., Ansible playbook) that instructs network devices, such as servers 12, TOR switches 16, chassis switches 18, and/or gateway device 22 how to implement the DCI. In one instance, the low-level device configuration data model may instruct gateway device 22 to implement one or more communication protocols, e.g., multiprotocol border gateway protocol (MP-BGP) or Internet Protocol VPN (IP VPN), used to communicate routing and reachability information of a tenant network of data center 10A with network devices of a remote data center, e.g., data center 10B. The low-level device configuration data model may also instruct network devices, such as server 12A, to tunnel traffic to gateway device 22A such that virtual machines of server 12A may communicate with a tenant network of a remote data center, e.g., data center 10B.

When translating high-level service configuration data model to the low-level device configuration data model, SDN controller 28 generates low-level configuration data for the network devices to configure the SDN controller 28 as a peer. For example, in an EVPN, L2 address learning (also referred to as "MAC learning") occurs in the control plane rather than in the data plane using a routing protocol. For example, in EVPNs, gateway device 22 (and other network devices) typically uses BGP or MP-BGP (i.e., an L3 routing protocol) to advertise reachability information (e.g., in a Network Layer Reachability Information (NLRI) field of a BGP update message) for the EVPN, such as the MAC addresses gateway device 22 has learned from one or more customer edge devices, e.g., virtual machines of servers 12. Gateway device 22 may exchange MP-BGP routes with a network device (e.g., gateway device) of remote data center 10B to provide connectivity across tenant networks of data centers 10A and 10B. When translating the high-level service configuration data model to the low-level device configuration data model, SDN controller 28 may generate low-level configuration data that configures the network devices implementing the DCI to recognize SDN controller 28 as a peer (or as a participant in the peering session). A peering module 29 for the SDN controller 28 may establish a peering session (e.g., BGP session) to obtain, and in some instances store, the routes that are exchanged by network devices of data centers 10A and data center 10B that implement the DCI. SDN controller 28 may present the routes to a user to determine whether the intent was properly configured and/or whether the routes exchanged are effective for route propagation for the DCI.

In this way, SDN controller 28 may have real-time or near real-time visibility of the control plane operation of network devices of data centers 10 that are configured based on the intent to implement the DCI, without relying on the exportation of control information via traditional means, such as SNMP traps, device logs, etc., that are slower and potentially more cumbersome (as each network device may need to be individually polled for the routes) than the techniques described herein. For example, to verify whether the intent is correctly configured, a user no longer is required to retrieve routing information from each network device participating in the DCI, e.g., by logging into an interface for each of the network devices to retrieve the routing advertisements, but instead has visibility on how the data center fabrics operate as routes are being exchanged by the network devices. Moreover, the SDN controller provides visibility on how the data center fabrics operate without operating as the control plane for the network devices implementing the DCI. For example, by maintaining the control plane operation with the network devices while enabling the SDN controller to have visibility of the control plane operation, the reliability of implementing the DCI is uncompromised.

Figure 2:
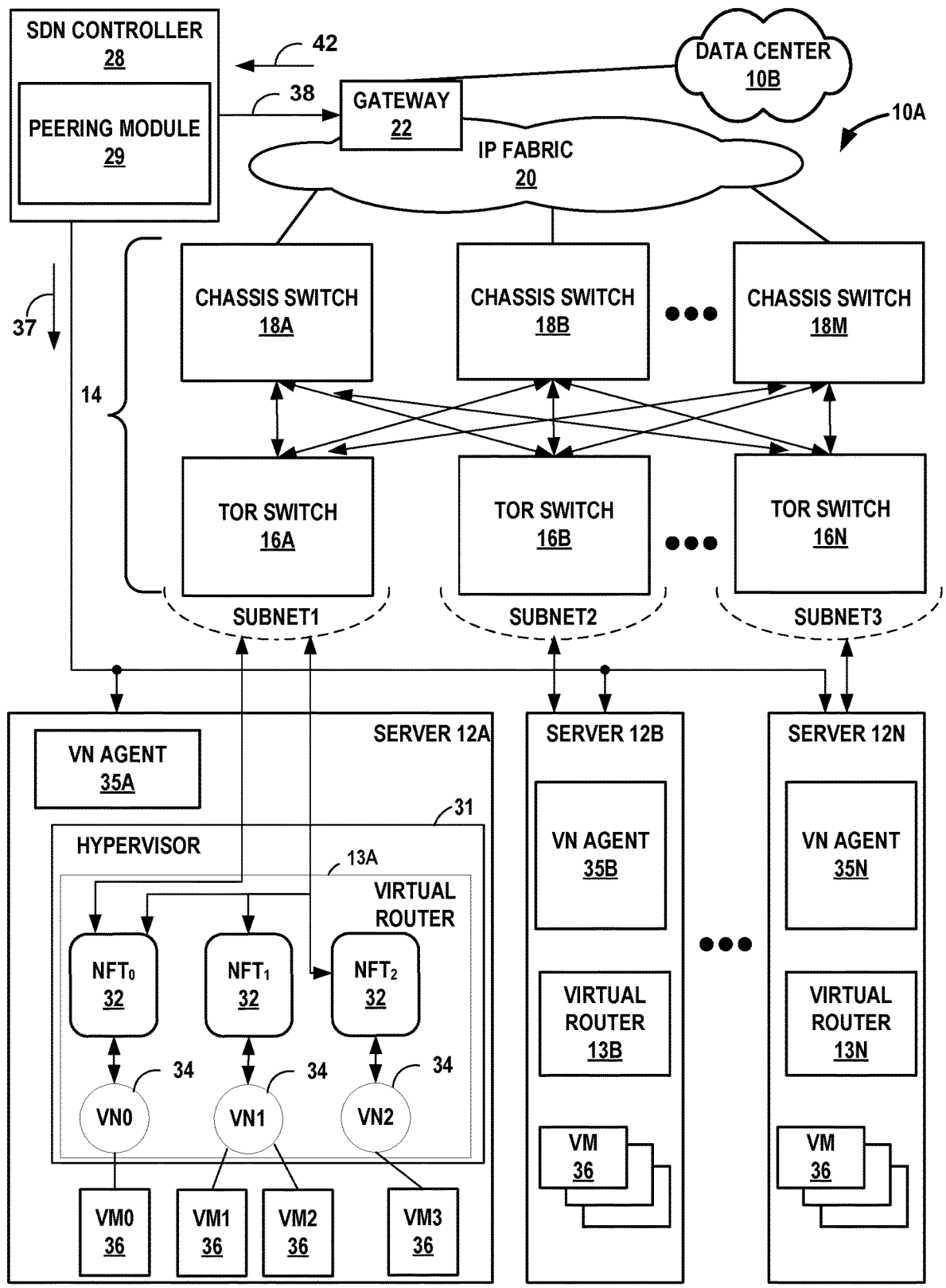
FIG. 2 is a block diagram illustrating an example implementation of the data center of FIG. 1 in further detail, according to the techniques described herein.

FIG. 2 is a block diagram illustrating an example implementation of data center 10A of FIG. 1 in further detail. In the example of FIG. 2, data center 10A includes interconnections that extend switch fabric 14 from physical switches 16, 18 to virtual routers 13. Virtual routers 13 dynamically create and manage one or more virtual networks 34 usable for communication between application instances. As one example, virtual routers 13 execute the virtual network as an overlay network, which provides the capability to decouple an application's virtual address from a physical address (e.g., IP address) of the one of servers 12A-12N ("servers 12") on which the application is executing. Each virtual network may use its own addressing and security scheme and may be viewed as orthogonal from the physical network and its addressing scheme.

Each virtual router 13 may execute within a hypervisor, a host operating system or other component of each of servers 12. Each of servers 12 may represent an x86 or other general-purpose or special-purpose server capable of executing virtual machines 36. In the example of FIG. 2, virtual router 13A executes within hypervisor 31, also often referred to as a virtual machine manager (VMM), which provides a virtualization platform that allows multiple operating systems to concurrently run on one of servers 12. In the example of FIG. 2, virtual router 13A manages virtual networks 34, each of which provides a network environment for execution of one or more virtual machines 36 ("VMs 36") on top of the virtualization platform provided by hypervisor 31. Each VM 36 is associated with one of the virtual networks VN0-VN2 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of VMs 36 may represent containers, another form of virtualized execution environment. That is, both virtual machines and container are examples of virtualized execution environments for executing application workloads.

In general, each VM 36 may be any type of software application and may be assigned a virtual address for use within a corresponding virtual network 34, where each of the virtual networks may be a different virtual subnet provided by virtual switch 13A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35N (collectively, "VN agents 35") that controls virtual networks 34 and that coordinates the routing of data packets within server 12. In general, each VN agent 35 communicates with SDN controller 28, which generates commands to control routing of packets through data center 10A. VN agents 35 may operate as a proxy for control plane messages between virtual machines 36 and SDN controller 28. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets, generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 13, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more tunnels for interconnecting different types of application workloads (e.g., VMs). Tunneling protocols may include IP-in-IP, IP over Generic Routing Encapsulation (GRE), Virtual Extensible Local Area Network (VxLAN), Multiprotocol Label Switching (MPLS) over GRE, MPLS over User Datagram Protocol (UDP), other tunneling protocols.

As noted above, SDN controller 28 provides a logically centralized controller for facilitating operation of one or more virtual networks within data center 10A. SDN controller 28 may, for example, maintain a routing information base, e.g., one or more routing tables, that store routing information for the physical network as well as one or more networks of data center 10A. Similarly, physical switches 16, 18 and virtual routers 13 maintain routing information, such as one or more routing and/or forwarding tables. In one example implementation, virtual router 13A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In accordance with the techniques described herein, SDN controller 28 is configured to model a DCI as an intent of a high-level service configuration data model and, when translating the high-level service configuration data model to a low-level device configuration data model, the SDN controller 28 generates low-level configuration data that configures the SDN controller 28 as a peer to the network devices configured to implement the DCI. For example, a user (e.g., administrator 24 of FIG. 1) may define a high-level service configuration data model to implement a DCI to connect a tenant network (e.g., virtual network 34) of data center 10A to a tenant network (e.g., virtual network) of a remote data center, e.g., data center 10B.

SDN controller 28 may translate the high-level service configuration data model (e.g., high-level business rules) for the DCI to a low-level device configuration data model (e.g., low-level rules/policies). SDN controller 28 may push the low-level configuration data to network devices (e.g., gateway device 22, physical switches 16, 18, and/or virtual routers 13) to implement the DCI. For example, SDN controller 28 may use a messaging communication protocol such as eXtensible Messaging and Presence Protocol (XMPP) to send low-level configuration data as XMPP message 37 to VN agent 35A to cause server 12A to configure a virtual router, e.g., virtual router 13A, for a tenant network (e.g., virtual network 34) of data center 10A. The low-level configuration data may further instruct virtual router 13A to implement protocols to send traffic destined for a tenant network of remote data center 10B over a tunnel from the virtual router to gateway device 22, which in turn communicates with a network device of remote data center 10B.

SDN controller 28 may also use NETCONF to send low-level configuration data in a NETCONF message 38 to physical devices, e.g., gateway device 22, that causes gateway device 22 to implement a DCI to connect the tenant network, e.g., virtual network 34, of data center 10A to a tenant network of a remote data center 10B. For example, the low-level configuration data may cause gateway device 22 to implement a communication protocol such as MP-BGP to advertise routing and reachability (e.g., through the NLRI of a BGP update message) of the tenant network. In other examples, gateway device 22 may implement IP VPN to advertise routing and reachability information of the tenant network. In some examples, SDN controller 28 may invoke Ansible playbooks that use the low-level configuration data as attributes to be parsed into configuration data that is injected to NETCONF compatible devices, such as gateway device 22.

When translating high-level service configuration data model to the low-level device configuration data model, SDN controller 28 may generate low-level configuration data that configures SDN controller 28 as a peer to the network devices configured to implement the DCI. For example, the low-level configuration data may configure the network devices implementing the DCI to recognize SDN controller 28 as a peer (or as a participant in the peering session). Peering module 29 of SDN controller 28 may establish a peering session with the network devices to obtain, and in some instances store, routes 42 that are exchanged by network devices of data center 10A and the network devices of remote data center 10B. The routes 42 may include routing and reachability information for the EVPN, such as the MAC address gateway device 22 has learned from a customer edge device, e.g., virtual machines 36 of servers 12. Peering module 29 may present the obtained routes 42 to a user to determine whether the intent was properly configured and/or whether the routes exchanged are effective for route propagation for the DCI.

Figure 3:
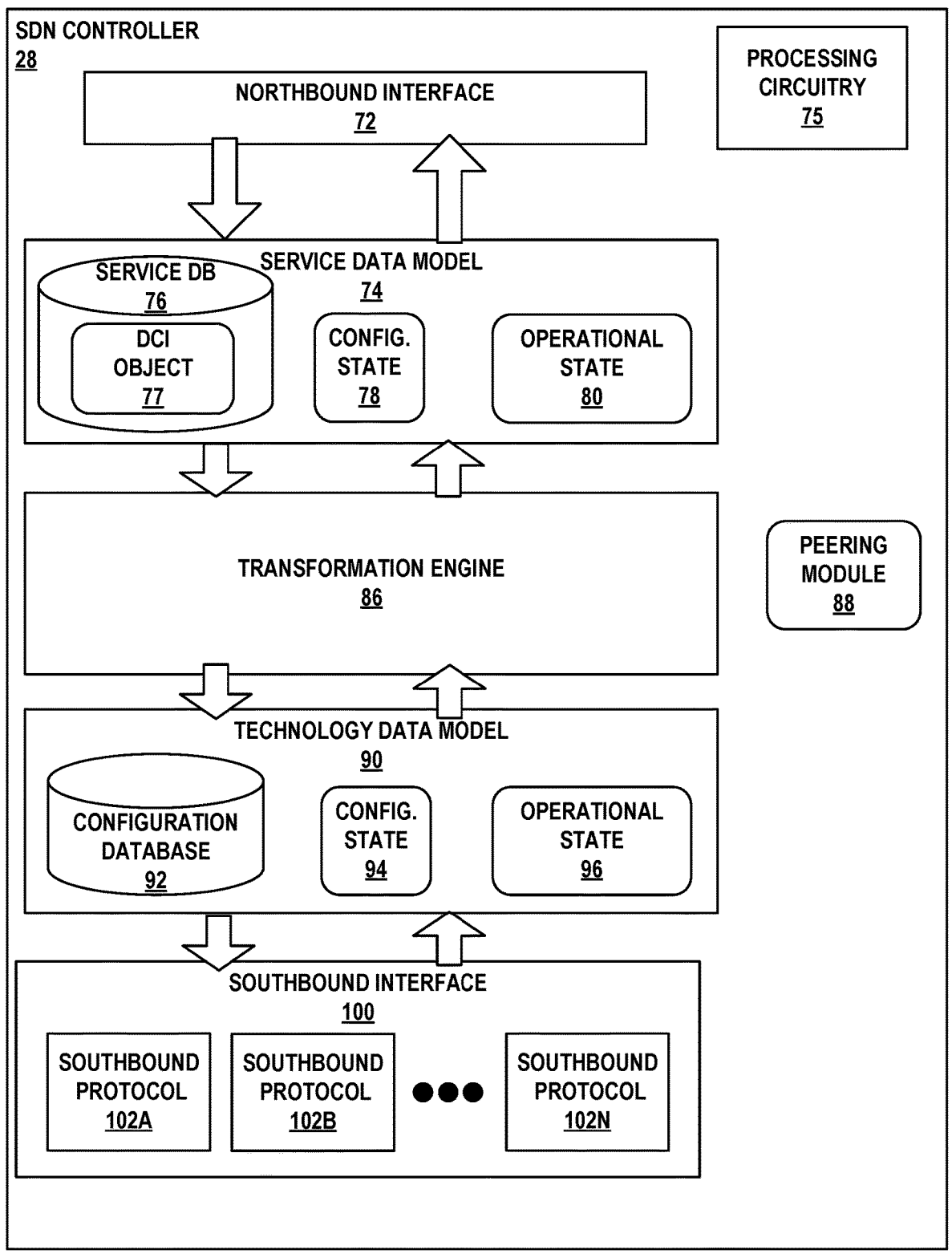
FIG. 3 is a block diagram illustrating an example instance of an SDN controller according to techniques described in this disclosure.

FIG. 3 is a block diagram illustrating an example instance of software-defined networking (SDN) controller 28, in accordance with one or more techniques described in this disclosure. SDN controller 28 is a logically centralized but in some cases physically distributed controller for a network that may be configured to manage configurations of one or more network devices, such as servers 12, TOR switches 16, chassis switches 18, and gateway device 22 of FIG. 1. SDN controller 28 of FIG. 3 may represent an example instance of SDN controller 28 of FIGS. 1-2.

SDN controller 28 may include processing circuitry 75. Processing circuitry 75 may include one or more processors that are configured to implement functionality and/or process instructions for execution within SDN controller 28. For example, processing circuitry 75 may include, for example, microprocessors, DSPs, ASICs, FPGAs, or equivalent discrete or integrated logic circuitry, or a combination of any of the foregoing devices or circuitry.

Some components of SDN controller 28 are not shown for ease of illustration purposes. These components may include hardware and instructions to execute modules of SDN controller 28. In the example of FIG. 3, SDN controller 28 presents a northbound interface 72 that interfaces with an orchestrator (e.g., orchestration engine 26 of FIG. 1), administrator (e.g., administrator 24 of FIG. 1), or other entity to install configuration state using a high-level service configuration data model, e.g., service data model 74. More specifically, northbound interface 72 that may be invoked to modify configuration state 78 ("config. state 78") or extract operational state 80 of the SDN controller 28 that is descriptive of the service data model 74. Northbound interface 72 may be used for integration with an orchestration system such as OpenStack; northbound interface 72 may also or alternatively be used by other applications or the operator's Operations Support Systems (OSS)/Business Support Systems (BSS). Northbound interface 72 may in some cases present a RESTful Application Programming Interface (API).

Service database 76 stores objects that represent instantiated services within a formal service data model 74. The formal service data model 74 is a high-level service configuration data model used to describe the services that need to be implemented; each high-level service data model has an associated low-level device configuration data model, e.g., technology data model 90, that describes how those services need to be implemented. Each data model comprises of a set of objects, their capabilities, and the relationships between them.

Transformation engine 86 transforms the service objects in service database 76 from the high-level service data model 74 to corresponding lower-level objects in the technology data model 90. Transformation engine 86 may include a schema transformer (not shown in FIG. 3) that converts high-level concepts into low-level objects that can be implemented by the network. For instance, the schema transformer allocates one or more routing-instance objects for a virtual-network. In this sense, transformation engine 86 operates as a compiler to transform the service data model 74 to the technology data model 90. That is, transformation engine 86 may "map" the service data model 74 to the technology data model 90 to describe how the services described in the high-level service data model are to be implemented. Whereas the high-level service data model 74 describes services previously requested and instantiated or being processed for eventual instantiation with the network segment under control of SDN controller 28, the low-level technology data model 90 describes how those services are implemented or are to be implemented within the network, as represented in configuration database 92.

Configuration database 92 may include, for example, one or more objects that describe a data center interconnect, or traffic engineered label switched path or tunnel that at least partially implements a service in service database 76. Configuration database 92 further includes identifiers of network resources of the network managed by SDN controller 28, such as network devices of data center 10A (e.g., gateway device 22). The technology data model 90 includes configuration state 94 that describes respective configurations of the network elements (e.g., routing instances and forwarding policy) as well as operational state 96 that describes respective operational characteristics of the network elements, such as load, available bandwidth, etc.

Put another way, the high-level service data model 74 describes the desired state of the network under the control of SDN controller 28 at a very high level of abstraction, using objects that map directly to services provided to end users—for example, a virtual network (e.g., a virtual overlay network), a connectivity policy (e.g., connectivity between workloads and endpoints such as VMs or bare metal servers), or a security policy. The low-level technology data model 90, on the other hand, describes the desired state of the network at a very low level of abstraction, using objects that map to specific network protocol constructs (e.g., routing instances, routing sessions (e.g., BGP session), routes, etc.).

Southbound interface 100 executes one or more southbound protocols 102A-102N (collectively, "southbound protocols 102") with which SDN controller 28 may obtain configuration state 94 and operational state 96 from and inject configuration state 94 and operational state 96 into a network segment under the control of SDN controller 28, where configuration state 94 and operational state 96 store objects intelligible to southbound protocols 102 and mapped to constructs of southbound protocols 102. For example, SDN controller 28 may include an Interface to Metadata Access Points (IF-MAP) server that provides a southbound API to push computed low-level configuration data to a control unit/node (not shown in FIG. 3) that implements a logically centralized portion of the control plane. In this way, SDN controller 28 may make the state of the network under control of SDN controller 28 match the desired state of the network as received by SDN controller 28 via northbound interface 72 and represented by service data model 74.

Southbound protocols 102 may include protocols for path provisioning as well as for topology discovery. For example, southbound protocols 102 may include MP-BGP or IP VPN to listen for routing information exchanged by network devices. Southbound protocols 102 may also include protocols to control network devices in the data centers, such as JSON or JSON-RPC and/or NETCONF/YANG. Southbound protocols 102 may further include other protocols such as Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), Interface to the Routing System (I2RS) protocols, CLIs for the network elements, and SNMP.

In accordance with the techniques of this disclosure, SDN controller 28 may model a DCI as an overlay networking object (illustrated as "DCI object 77") stored in service database 76. Transformation engine 86 transforms the DCI object 77 in service database 76 from the high-level service data model 74 to corresponding lower-level objects in the technology data model 90 that describes how the DCI is implemented, as represented in configuration database 92. Configuration database 92 may include, in this example, an object that maps to specific network protocol constructs for the data center interconnect.

In one example, transformation engine 86 may implement a translation function to translate the DCI object 77 from the high-level service data model 74 to low-level objects in the technology data model 90. For example, transformation engine 86 may translate DCI object 77 to low-level objects constructed as NETCONF messages and store the objects in configuration database 92. In one example, the translation function may implement Ansible that uses the low-level objects as attributes to be parsed into configuration information that is injected to NETCONF compatible devices (e.g., gateway device 22 of data center 10A). More specifically, SDN controller 28 may configure a low-level device configuration data model (e.g., Ansible playbook) that operates on one or more network devices, e.g., gateway device 22. Each low-level device configuration data model specifies gateway device 22 on which the tasks operate, the lists of tasks to execute on gateway device 22, and any required variables or module parameters. These modules may include configuration instructions to manage configuration information of gateway device 22, specify a port to use when building a connection from gateway device 22 to a remote device, manage layer 2 (L2) and/or layer 3 (L3) interfaces of gateway device 22, manage VLANs on gateway device 22, and other configuration instructions.

SDN controller 28 may then inject low-level objects in configuration database 92 and configuration state 94 into a network segment under control of SDN controller 28 to create the required connectivity and execution of the data center interconnect. SDN controller 28 may inject low-level objects in configuration database 92 and configuration state 94 using one or more southbound protocols 102. For example, SDN controller 28 may use, for example, one of southbound protocols 102 to implement NETCONF to inject low-level objects in configuration database 92 and configuration state 94 in gateway device 22 that is configured based on the intent to implement the DCI as defined in DCI object 77.

When translating the service data model 74 to a technology data model 90, SDN controller 28 may generate low-level configuration data to configure within the network devices implementing the DCI to recognize the SDN controller as a peer (or as a participant in the BGP session). Peering module 88 may establish a peering session with the network devices to obtain routes exchanged between the network devices configured to implement the DCI. For example, after network devices are configured to implement the DCI, the network devices may exchange routes, e.g., MP-BGP routes, to advertise routing and reachability of a tenant network of a data center. As a BGP peer, the network devices may send the routes to SDN controller 28. Peering module 88 of SDN controller 28 may obtain, and in some instances store, these routes. Peering module 88 may present the obtained routes to a user to determine whether the intent was properly configured and/or whether the routes exchanged are effective for route propagation for the DCI.

Figure 4:
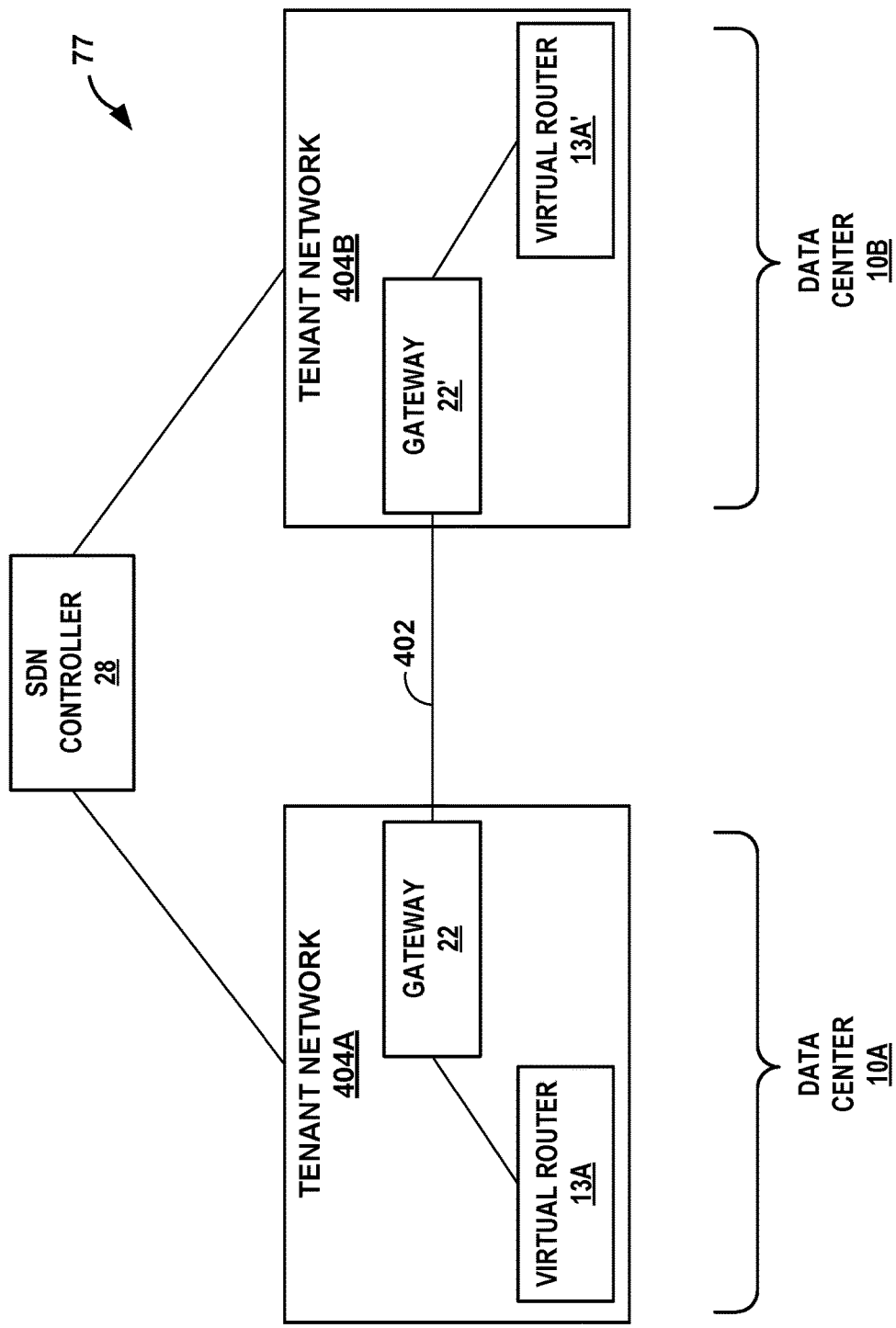
FIG. 4 is a conceptual diagram illustrating an example data center interconnect object of FIG. 3 in further detail, in accordance with the techniques described in this disclosure.

FIG. 4 is a conceptual diagram illustrating an example data center interconnect object of FIG. 3 in further detail, in accordance with the techniques described in this disclosure. The DCI object 77 of FIG. 4 is described with respect to FIGS. 1-3.

As described above, a user may define a desired state of the network at a very high level of abstraction. For example, a user may use SDN controller 28 to define a data center interconnect between tenant network 404A of data center 10A and tenant network 404B of remote data center 10B. SDN controller 28 may model the data center interconnect as DCI object 77. In the example of FIG. 4, DCI object 77 may map a data center interconnect 402 that provides connectivity for tenant networks 404A of data center 10A and tenant network 404B of remote data center 10B. SDN controller 28 may map the DCI object 77 as a network overlay object.

As described above, a transformation engine (e.g., transformation engine 86 of FIG. 3) of an SDN controller may transform the DCI object 77 to corresponding lower-level data model that describes how the data center interconnect 402 is to be implemented. For example, SDN controller 28 may translate the DCI object 77 into a lower-level data model that includes identifiers of network devices (e.g., virtual routers 13A,13A', gateway devices 22, 22') to implement data center interconnect 402, configurations for the network devices to implement data center interconnect 402, such as routing instances and forwarding policy, as well as operational characteristics of the network devices, such as load, available bandwidth, etc. In the example of FIG. 4, DCI object 77 is translated into lower-level objects that may include information to configure virtual router 13A of data center 10A to operate as a router for tenant network 404A and a virtual router 13A' of data center 10B to operate as a router for tenant network 404B. The lower-level objects may also include configuration information to configure the interconnection between tenant networks 404A and 404B. For example, the lower level objects may include configuration information for gateway devices 22 and 22' to cause the gateway devices to implement a communication protocol, such as MP-BGP, to communicate routing and reachability information for virtual routers 13A and 13A', respectively.

In one example, the translation function may implement Ansible that uses the low-level objects as attributes to be parsed into configuration information that is injected to NETCONF compatible devices (e.g., gateway devices 22 and 22'). Each low-level device configuration data model (e.g., Ansible playbook) specifies for gateway devices 22 and 22' on which the tasks operate, the lists of tasks to execute on the gateway devices, and any required variables or module parameters. These modules may include configuration instructions to manage configuration information of gateway devices 22 and 22', specify ports to use when building a connection between gateway devices 22 and 22', manage layer 2 (L2) and/or layer 3 (L3) interfaces of gateway devices 22 and 22', manage VLANs on gateway devices 22 and 22', and other configuration instructions. These modules may also include configuration instructions to configure gateway devices 22 and 22' to recognize the SDN controller 28 as a peer (or as a participant in the BGP session). The SDN controller 28 may establish a peering session with the gateway devices 22 and 22' to obtain routes exchanged between gateway devices 22 and 22' configured to implement the DCI. For example, after gateway devices 22 and 22' are configured to implement the DCI, the network devices may exchange routes, e.g., MP-BGP routes, to advertise routing and reachability of a tenant network of a data center. As a BGP peer, the gateway devices 22 and 22' may send the routes to SDN controller 28. SDN controller 28 may obtain, and in some instances store, these routes. SDN controller 28 may present the obtained routes to a user to determine whether the intent was properly configured and/or whether the routes exchanged are effective for route propagation for the DCI.

Figure 5:
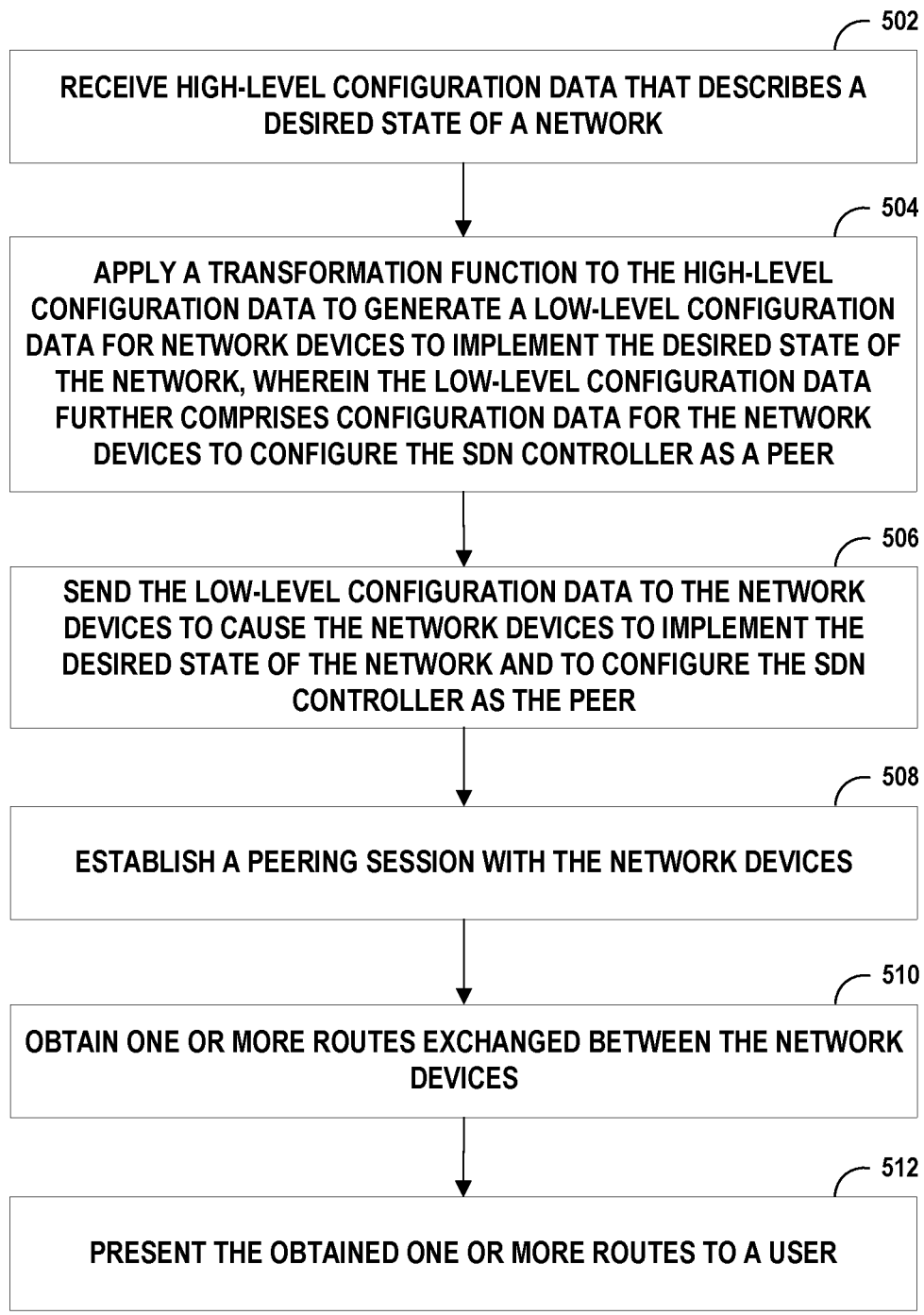
FIG. 5 is a flowchart illustrating an example operation of an SDN controller according to techniques described in this disclosure.

FIG. 5 is a flowchart illustrating an example operation of an SDN controller in accordance with the techniques of the disclosure. For convenience, FIG. 5 is described with respect to FIGS. 1, 2, and 3. In the example of FIG. 5, SDN controller 28 may receive a high-level configuration data that describes a desired state of a network at a high level of abstraction (502). For example, a user (e.g., administrator 24 of FIG. 1) may define a data center interconnect for connecting tenant networks of remote data centers, e.g., data centers 10A and 10B. SDN controller 28 may model the DCI as an intent (e.g., DCI object 77 of FIG. 4) of a high-level service configuration data model.

SDN controller 28 may apply a transformation function to the high-level configuration data to generate a low-level configuration data for network devices configured to implement the desired state of the network, wherein the low-level configuration data further comprises configuration data for the network devices to configure the SDN controller as a peer to obtain one or more routes exchanged between the network devices (504). For example, a transformation engine of SDN controller 28 may "map" a high-level service configuration data model, e.g., DCI model 77, to a low-level device configuration data model to describe how the services, e.g., DCI, described in the high-level service data model are to be implemented within the network. The device configuration data model describes the desired state of the network at a very low level of abstraction, using objects that map to specific network protocol constructs (e.g., routing instances).

When translating the high-level configuration data to low-level configuration data, the low-level configuration data may also comprise configuration data for the network devices to configure the SDN controller as a peer to the network devices (or as a participant in the peering session) to obtain one or more routes exchanged between the network devices. For example, when translating high-level service configuration data model to the low-level device configuration data model, the network devices are configured to recognize SDN controller 28 as a peer such that the SDN controller may obtain control plane information of the DCI via routes exchanged by the network devices. In an EVPN, gateway device 22 typically uses BGP or MP-BGP (i.e., an L3 routing protocol) to advertise reachability information for the EVPN, such as the MAC addresses gateway device 22 has learned from a customer edge device, e.g., virtual machines of servers 12. SDN controller 28 may include peering module 29 to obtain the routes that are exchanged between gateway device 22 of data center 10A and the network device of remote data center 10B.

SDN controller 28 sends the low-level configuration data to the network devices to cause the network devices to implement the desired state of the network and to configure the SDN controller as the peer (506). For example, transformation engine 86 of SDN controller 28 may translate DCI object 77 to low-level objects constructed as NETCONF messages and store the objects in configuration database 92. In one example, the translation function may implement Ansible that uses the low-level objects as attributes to be parsed into configuration information that is injected to NETCONF compatible devices (e.g., gateway device 22 of data center 10A). Each play specifies network devices on which the tasks operate, the lists of tasks to execute on the network devices, and any required variables or module parameters. These modules may include configuration instructions to manage configuration information of the network devices, specify a port to use when building a connection between the network devices, manage layer 2 (L2) and/or layer 3 (L3) interfaces of the network devices, manage VLANs on the network devices, and other configuration instructions. SDN controller 28 may then inject low-level objects in configuration database 92 and configuration state 94 into a network segment under control of SDN controller 28 to create the required connectivity and execution of the data center interconnect. SDN controller 28 may inject low-level objects in configuration database 92 and configuration state 94 using one or more southbound protocols 102. For example, SDN controller 28 may use, for example, one of southbound protocols 102 to implement NETCONF to inject low-level objects in configuration database 92 and configuration state 94 in gateway device 22 that is configured based on the intent to implement the DCI.

SDN controller may establish a peering session with the network devices implementing the desired state of the network (508). For example, peering module 29 of SDN controller 28 may establish a peering session, e.g., BGP session, with the network devices implementing the DCI. SDN controller 28 may, via the peering session, obtain one or more routes exchanged between the network devices configured to implement the desired state of the network (510). As described above, the network devices may exchange routes advertising routing and reachability information. SDN controller 28 may include peering module 29 to peer with the network devices to obtain the routes that are exchanged between the network devices.

SDN controller 28 may present the obtained one or more routes to a user (512). For example, SDN controller 28 may present the obtained one or more routes through an interface (e.g., graphical user interface) to a user to determine whether the high-level configuration data is properly configured.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
   receiving, by a software defined networking (SDN) controller, high-level configuration data that describes a desired state of a network managed by the SDN controller at a high level of abstraction;
   applying, by the SDN controller, a transformation function to the high-level configuration data to generate a low-level configuration data for network devices configured to implement the desired state of the network, wherein the low-level configuration data further comprises configuration data for the network devices to configure the SDN controller as a peer to obtain one or more routes exchanged between the network devices; and
   sending, by the SDN controller, the low-level configuration data to the network devices to cause the network devices to implement the desired state of the network and to configure the SDN controller as the peer to obtain one or more routes exchanged between the network devices;
   establishing, by the SDN controller, a peering session with the network devices;
   obtaining, by the SDN controller via the peering session, one or more routes exchanged between the network devices configured to implement the desired state of the network; and
   presenting, by the SDN controller, the one or more obtained routes to a user to determine whether the high-level configuration data that describes the desired state of the network is properly configured.

2. The method of claim 1,
   wherein the high-level configuration data that describes the desired state of the network comprises a data center interconnect modeled as a network overlay object for the high-level configuration data.

3. The method of claim 1, wherein the low-level configuration data translated from the data center interconnect modeled as the network overlay object comprises configuration data that causes the network devices to implement multiprotocol border gateway protocol to advertise routing and reachability information for a tenant network of a data center to a tenant network of a remote data center.

4. The method of claim 1, wherein configuring the SDN controller as the peer to the network devices comprises configuring the SDN controller as a border gateway protocol peer.

5. The method of claim 1,
   wherein the transformation function constructs an Ansible playbook for the network devices.

6. A software defined networking (SDN) controller comprising:
   a memory;
   one or more processors coupled to the memory, wherein the one or more processors are configured to:
     receive high-level configuration data that describes a desired state of a network managed by the SDN controller at a high level of abstraction;
     apply a transformation function to the high-level configuration data to generate a low-level configuration data for network devices configured to implement the desired state of the network, wherein the low-level configuration data further comprises configuration data for the network devices to configure the SDN controller as a peer to obtain one or more routes exchanged between the network devices; and
     send the low-level configuration data to the network devices to cause the network devices to implement the desired state of the network and to configure the SDN controller as the peer to obtain one or more routes exchanged between the network devices
     establish a peering session with the network devices;
     obtain, via the peering session, one or more routes exchanged between the network devices configured to implement the desired state of the network; and present the one or more obtained routes to a user to determine whether the high-level configuration data that describes the desired state of the network is properly configured.

7. The SDN controller of claim 6,
wherein the high-level configuration data that describes the desired state of the network comprises a data center interconnect modeled as a network overlay object for the high-level configuration data.

8. The SDN controller of claim 6, wherein the low-level configuration data translated from the data center interconnect modeled as the network overlay object comprises configuration data that causes the network devices to implement multiprotocol border gateway protocol to advertise routing and reachability information for a tenant network of a data center to a tenant network of a remote data center.

9. The SDN controller of claim 6, wherein configuring the SDN controller as the peer to the network devices comprises configuring the SDN controller as a border gateway protocol peer.

10. The SDN controller of claim 6,
wherein the transformation function constructs an Ansible playbook for the network devices.

11. A non-transitory computer-readable storage medium comprising instructions for causing one or more programmable processors to:
receive high-level configuration data that describes a desired state of a network managed by the SDN controller at a high level of abstraction;
apply a transformation function to the high-level configuration data to generate a low-level configuration data for network devices configured to implement the desired state of the network, wherein the low-level configuration data further comprises configuration data for the network devices to configure the SDN controller as a peer to obtain one or more routes exchanged between the network devices; and
send the low-level configuration data to the network devices to cause the network devices to implement the desired state of the network and to configure the SDN controller as the peer to obtain one or more routes exchanged between the network devices
establish a peering session with the network devices;
obtain, via the peering session, one or more routes exchanged between the network devices configured to implement the desired state of the network; and
present the one or more obtained routes to a user to determine whether the high-level configuration data that describes the desired state of the network is properly configured.

12. The non-transitory computer-readable storage medium of claim 11,
wherein the high-level configuration data that describes the desired state of the network comprises a data center interconnect modeled as a network overlay object for the high-level configuration data.

13. The non-transitory computer-readable storage medium of claim 11, wherein the low-level configuration data translated from the data center interconnect modeled as the network overlay object comprises configuration data that causes the network devices to implement multiprotocol border gateway protocol to advertise routing and reachability information for a tenant network of a data center to a tenant network of a remote data center.

14. The non-transitory computer-readable storage medium of claim 11, wherein configuring the SDN controller as the peer to the network devices comprises configuring the SDN controller as a border gateway protocol peer.

15. The non-transitory computer-readable storage medium of claim 11,
wherein the transformation function constructs an Ansible playbook for the network devices.

\* \* \* \* \*